United States Patent

(12) United States Patent
Chang

(10) Patent No.: US 10,484,549 B1
(45) Date of Patent: Nov. 19, 2019

(54) PREPARATION TOOL FOR COLOR PRINT PRESENTATION

(71) Applicant: KYOCERA DOCUMENT SOLUTIONS INC., Osaka (JP)

(72) Inventor: Michael M. Chang, El Segundo, CA (US)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 16/052,028

(22) Filed: Aug. 1, 2018

(51) Int. Cl.
G06K 15/00 (2006.01)
H04N 1/00 (2006.01)
H04N 1/21 (2006.01)

(52) U.S. Cl.
CPC ....... *H04N 1/0044* (2013.01); *H04N 1/00034* (2013.01); *H04N 1/00092* (2013.01); *H04N 1/00411* (2013.01); *H04N 1/00472* (2013.01); *H04N 1/2166* (2013.01)

(58) Field of Classification Search
None
See application file for complete search history.

(56) References Cited

U.S. PATENT DOCUMENTS

| 4,163,269 A | 7/1979 | Helwig, Jr. et al. | |
|---|---|---|---|
| 9,704,441 B2 | 7/2017 | Fiske et al. | |
| 2002/0109743 A1* | 8/2002 | Yamaguchi | B41J 13/0027 347/16 |
| 2002/0171868 A1* | 11/2002 | Yoshimura | G06F 3/1208 358/1.15 |
| 2010/0271492 A1* | 10/2010 | Gyotoku | H04N 1/00167 348/207.2 |
| 2011/0176157 A1* | 7/2011 | Katayama | H04N 1/6033 358/1.9 |
| 2012/0002994 A1* | 1/2012 | Moroney | G03G 15/5016 399/72 |
| 2014/0043626 A1* | 2/2014 | Teraue | G06K 15/027 358/1.9 |

(Continued)

OTHER PUBLICATIONS

Webster et al., The Influence of Contrast Adaptation on Color Appearance, Vision Res. vol. 34., No. 15, pp. 1993-2020, 1994.

(Continued)

*Primary Examiner* — Huo Long Chen
(74) *Attorney, Agent, or Firm* — McDonnell Boehnen Hulbert & Berghoff LLP

(57) ABSTRACT

An example system includes a processor and a non-transitory computer-readable medium having stored therein instructions that are executable to cause the system to perform various functions. The functions include, for each sample print of a plurality of sample prints, receiving respective color-measurement data indicative of color measurement patches printed on the sample print. The functions also include determining, using the respective color-measurement data for the sample prints, a respective color gamut volume for each sample print. Further, the functions include ordering the sample prints in order of increasing color gamut volume using the respective color gamut volumes for the sample prints. Still further, the functions include providing for display a presentation order for the sample prints, with the sample prints of the plurality of sample prints being arranged in order of increasing color gamut volume.

19 Claims, 10 Drawing Sheets

(56) References Cited

U.S. PATENT DOCUMENTS

2016/0189594 A1     6/2016   Cameron
2017/0136777 A1*   5/2017   Ono .................... B41J 2/17566
2018/0113658 A1*   4/2018   Sikkink ................ G06F 3/1204

OTHER PUBLICATIONS

Morovic et al., A Multi-Resolution, Full-Colour Spatial Gamut Mapping Algorithm, 11th IS&T/SID Color Imaging Conference, Scottsdale, AZ, pp. 282-287, 2003.
Fairchild, Color Appearance Models, 2nd Ed., Munsell Color Science Laboratory, Rochester Institute of Technology, USA, 409 pages, 2005.
Tregillus et al., Dynamics of Color Contrast Adaptation, J Opt Soc Am A Opt Image Sci Vis 31(4): A314-A321, Apr. 1, 2014.
Consistent Colour Appearance, International Color Consortium, http://www.color.org/resources/consistentappearance.xalter, Nov. 15, 2018.

* cited by examiner

PREPARATION TOOL FOR COLOR PRINT PRESENTATION

BACKGROUND

A print shop is a business that prints things for customers. For example, a print shop may print a small catalog or a book for a customer. In many cases, the printed item may include color images. The print shop may offer a variety of options that affect the quality of the color images, in terms of the type of printer, the type of media, and pricing.

Before selecting one or more options, an employee of the print shop may present the customer with a number of printed samples so that the customer can evaluate the various options. If the print shop utilizes modern equipment, the samples may have good color quality and consistent color appearance (CCA) across these samples. The exact colors of the samples may be different, however, due to color gamut differences among the samples.

A color gamut is the range of colors that can be physically produced in a particular environment for a particular medium. By way of example, the color gamut of a production inkjet printer is dependent on two factors: (i) the ink-media interaction and (ii) the image processing and color management of the printing pipeline. In one scenario, the same printer, using the same printing pipeline, can produce samples having two different color gamuts when printing on two different media. Similarly, two different printers, printing samples on the same media, could have different color management policies, resulting in two different color gamuts.

SUMMARY

In one example, a system is described. The system includes a processor and a non-transitory computer-readable medium having stored therein instructions that are executable to cause the system to perform various functions. The functions include, for each sample print of a plurality of sample prints, receiving respective color-measurement data indicative of color-measurement patches printed on the sample print. The functions also include determining, using the respective color-measurement data for the sample prints, a respective color gamut volume for each sample print. Further, the functions include ordering the sample prints in order of increasing color gamut volume using the respective color gamut volumes for the sample prints. Still further, the functions include providing for display a presentation order for the sample prints, with the sample prints of the plurality of sample prints being arranged in order of increasing color gamut volume.

In another example, a method is described. The method includes, for each sample print of a plurality of sample prints, receiving, by a computing device from a color-measurement instrument coupled to the computing device, respective color-measurement data indicative of color-measurement patches printed on the sample print. The method also includes determining, by the computing device using the respective color-measurement data for the sample prints, a respective color gamut volume for each sample print. Further, the method includes, based on the respective color gamut volumes for the samples, ordering, by the computing device, the sample prints in order of increasing color gamut volume. Still further, the method includes providing for display a presentation order for the sample prints, with the sample prints of the plurality of prints being arranged in order of increasing color gamut volume.

In another example, a method is described. The method includes receiving, via a graphical user interface of a computing device, a request to print at least three sample prints of an input file, each sample print of the at least three sample prints being associated with a different printing configuration. The method also includes inserting, by the computing device, color-measurement patches into the input file so as to generate an output file. Further, the method includes causing, by the computing device, at least one printer to print the at least three sample prints using the output file. Still further, the method includes receiving, by the computing device, respective color-measurement data indicative of the color-measurement patches printed on each of the at least three sample prints. Still further, the method includes determining, by the computing device, a presentation order for the at least three sample prints based on the respective color-measurement data for the at least three sample prints. And the method includes providing for display the determined presentation order.

The features, functions, and advantages that have been discussed can be achieved independently in various embodiments or may be combined in yet other embodiments further details of which can be seen with reference to the following description and figures.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying figures, wherein:

DETAILED DESCRIPTION

Figure 1:
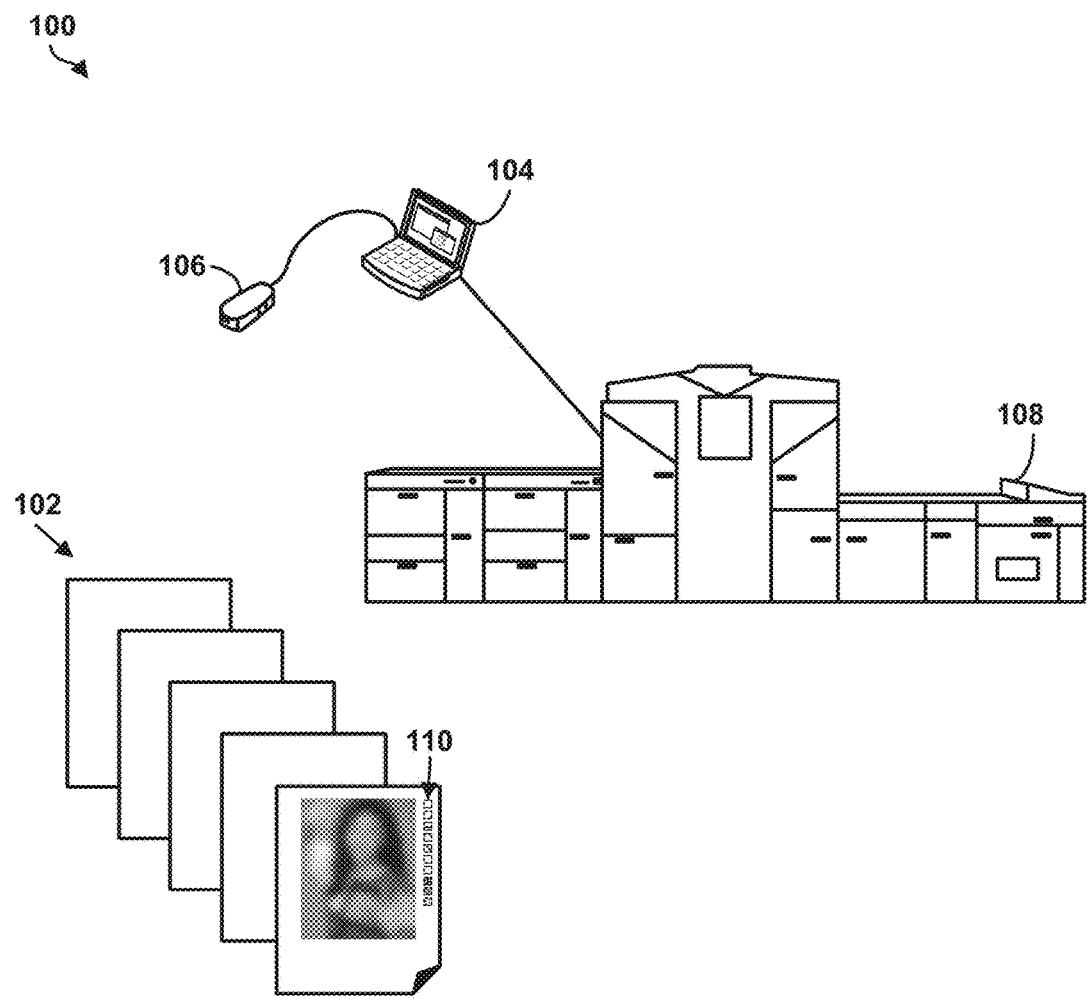
FIG. 1 conceptually illustrates an example system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

A print shop that provides a plurality of options for colored images, in terms of media, type of printer, and pricing, may present multiple printed samples for review by a customer. For instance, the printed samples could be presented side-by-side or sequentially, with each printed sample corresponding to a different option, so that the customer can compare the physical characteristics (e.g., appearance, touch, and feel) of the samples.

Unfortunately, however, a problem can arise when there are color differences across the samples. For instance, a strong impulse in terms of color saturation can negatively influence the customer's perception of the samples. By way of example, a first sample print may have a larger color gamut volume and be more saturated than a second sample print. With this example, the first sample print, being more saturated, may bias the customer's color judgement of the second sample print. Even though the second sample print may be on a more desirable media, the customer could nevertheless judge the second sample print as too "washed out".

Continuing with the example, there could also be a third sample print having a most appropriate weight and glossiness of the three sample prints. And, viewed by itself, the color quality of the third sample print could be very good. Yet, placed last in a sequence of the first sample print, the second sample print, and the third sample print, the first and second sample prints could have already biased the customer. In other words, presenting the first, second, and third sample prints in this order hinders the ability of the customer to observe the overall qualities of the first, second, and third sample prints, respectively.

In order to address this problem, described herein are computer implementations for determining a presentation order for a plurality of sample prints. In an example method, a computing device may determine a respective color gamut volume for each sample print of a plurality of sample prints, and order the plurality of sample prints in order of increasing color gamut volume. That is, the computing device can determine a presentation order in which the sample print with the smallest color gamut volume is first and the sample print with the largest color gamut volume is last. The computing device can then provide the presentation order for display, so that a user can present the sample prints in the presentation order. In this manner, an observer (e.g. a customer) can appropriately compare the sample prints without being negatively influenced by color differences across the plurality of sample prints.

In some examples, the computing device can insert color-measurement patches into an input file from which the sample prints are produced, so that the color-measurement patches are provided on the sample prints. The color-measurement patches could, for instance, be inserted into a margin of the input file.

Further, the computing device can prompt a user to capture color-measurement data indicative of the color-measurement patches using a color-measurement instrument. The color-measurement data can then provide the color-measurement data to the computing device, and the computing device can determine color gamut volumes of the sample prints using the captured color-measurement data.

Various other features of the example method discussed above, as well as other methods and systems, are described hereinafter with reference to the accompanying figures.

Referring now to the figures, FIG. 1 is a conceptual illustration of an example system 100. In line with the discussion above, system 100 may be used to determine a presentation order for a plurality of sample prints 102. As shown in FIG. 1, system 100 includes a computing device 104, a color-measurement instrument 106, and at least one printer 108.

Computing device 104 could be any type of computing device, such as a mobile phone, tablet computer, wearable computer, desktop computer, laptop computer, etc. Computing device 104 can include a processor, and a non-transitory computer-readable medium having stored therein instructions that are executable to cause computing device 104 to perform the computing device functions described herein. For instance, the non-transitory computer-readable medium could store instructions that are executable to cause computing device 104 to receive, for each sample print of plurality of sample prints 102, respective color-measurement data indicative of color-measurement patches printed on the sample print; determine, using the respective color-measurement data for the sampled prints, a respective color gamut volume for each sample print; order the sample prints in order of increasing color gamut volume; and provide for display a presentation order of the sample prints.

In line with the discussion above, each sample print of plurality of sample prints 102 can include color-measurement patches 110 printed on the sample print. Prior to printing, computing device 104, or another device, can insert color-measurement patches 110 into an electronic file from which the sample prints of plurality of sample prints 102 are produced. Inserting color-measurement patches 110 into the electronic file could involve obtaining an input file, determining a color space of the input file, and inserting digital color-measurement patches into the input file in accordance with the determined color space, thereby generating the electronic file. In one example, the input file could be a Portable Document Format (PDF) file, and the generated electronic file that includes the color-measurement patches could also be a PDF file.

Inserting the color-measurement patches into the electronic file causes the color-measurement patches 110 to properly demonstrate how the color gamut is reproduced in each sample print. Each sample print could be created using a different printing configuration. The printing configuration could include the type of media and type of printer.

Color-measurement patches 110 can include a plurality of patches of different colors. The plurality of patches of different colors can include at least a cyan patch, a magenta patch, a yellow patch, a key patch, a red patch, a green patch, and a blue patch. The plurality of patches can further include patches for dark saturated colors, such as dark red, dark blue, etc., as well as a black patch made up of composite cyan, magenta, yellow, and key.

Further in line with the discussion above, computing device 104 could receive color-measurement data from color-measurement instrument 106 that is indicative of color-measurement patches 110. Color-measurement instrument 106 can include a spectrophotometer, a colorimeter, or another similar type of instrument. In some examples, color-measurement instrument 106 can be a handheld instrument. Color-measurement instrument 106 could be coupled to computing device 104 via a wired or wireless link.

Color-measurement instrument 106 can provide the color-measurement data to computing device 104 as color-measurement instrument 106 measures individual color patches of color-measurement patches 110. Additionally or alternatively, color-measurement instrument 106 can include a data storage, and can be configured to store in the data storage color-measurement data for respective patches of color-measurement patches 110. The stored color-measurement data can then be uploaded to computing device 104 after completion of measurements or at a later time.

In some examples, the color-measurement data for the sample prints can include measurement values indicative of respective colors of the plurality of patches. The measurement values can include three-dimensional coordinates of a device-independent color space. For instance, the measurement values can include coordinates of the CIELAB color space, which expresses colors as three numerical values: L* for lightness, a* for the green-red color components and b* for the blue-yellow color components.

Computing device 104 can be configured to calculate or estimate color gamut volumes for the sample prints of plurality of sample prints 102 using the captured measurement values. The color gamut volumes can be computed in a perceptually uniform color space, such as the three-dimensional CIELAB color space. With gamut boundary descriptors in L*a*b*, the color gamut can be divided into three-dimensional tetrahedrons, and the sum of the volumes of these tetrahedrons can provide the color gamut volume.

The at least one printer 108 can be a peripheral device configured to produce text and/or graphics on documents originally stored as image data. The at least one printer 108 can include one or more digital inkjet printers. The at least one printer 108 can include various components, such as toner cartridges, liquid ink jets, paper feeds, belts, rollers, hard drives, power supplies, and scanners, amongst many other possibilities.

Further, the at least one printer 108 can be configured to receive an electronic file from computing device 104, and produce the sample prints of plurality of sample prints 102. In one example, plurality of sample prints 102 can include a first sample print printed on a first type of media and a second sample print printed on a second type of media that is different from the first type of media. The first sample print and the second sample print could be printed by the same printer, or the first sample print and the second sample print could be printed by different printers. Additionally or alternatively, plurality of sample prints 102 can include two sample prints printed by two different printers, respectively. Assuming the at least one printer 108 utilizes modern printing technology, the sample prints of plurality of sample prints can have CCA.

Figure 2:
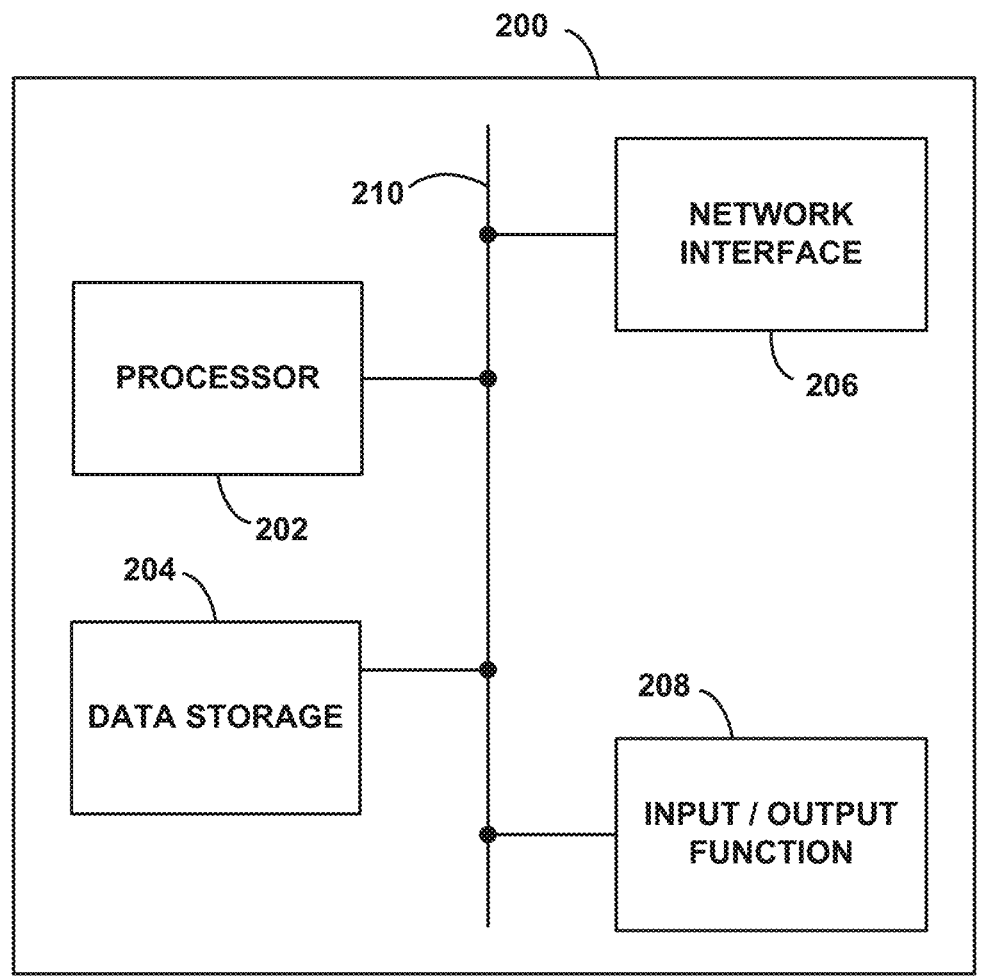
FIG. 2 illustrates an example computing device, according to an example embodiment.

FIG. 2 illustrates an example computing device 200, according to an example embodiment. FIG. 2 illustrates one or more of the functional elements that may be found in a device arranged to operate in accordance with the embodiments herein, such as computing device 104 of FIG. 1.

Computing device 200 may include a processor 202, data storage 204, network interface 206, and input/output function 208, all of which may be coupled by a system bus 210 or a similar mechanism. Processor 202 may include one or more central processing units (CPUs), such as one or more general purpose processors and/or one or more dedicated processors (e.g., application specific integrated circuits also known as ASICs or digital signal processors also known as DSPs, etc.).

Data storage 204, in turn, may comprise volatile and/or non-volatile data storage and can be integrated in whole or in part with processor 202. Data storage 204 may store program instructions, executable by processor 202, and data that are manipulated by these instructions to carry out the various methods, processes, or functions described herein. Alternatively, these methods, processes, or functions can be defined by hardware, firmware, and/or any combination of hardware, firmware and software. Therefore, data storage 204 may include a tangible, non-transitory computer-readable medium, having stored thereon program instructions that, upon execution by one or more processors, cause computing device 200 to carry out any of the methods, processes, or functions disclosed in this specification or the accompanying drawings.

Network interface 206 may take the form of a wire line connection, such as an Ethernet, Token Ring, or T-carrier connection. Network interface 206 may alternatively take the form of a wireless connection, such as WiFi, BLUETOOTH®, or a wide-area wireless connection. However, other forms of physical layer connections and other types of standard or proprietary communication protocols may be used over network interface 206. Furthermore, network interface 206 may comprise multiple physical communication interfaces.

Input/output function 208 may facilitate user interaction with example computing device 200. Input/output function 208 may comprise multiple types of input devices, such as a keyboard, a mouse, a touch screen, a microphone and/or any other device that is capable of receiving input from a user. Similarly, input/output function 208 may comprise multiple types of output devices, such as a display, printer, one or more light emitting diodes (LEDs), speaker, or any other device that is capable of providing output discernible to a user. Additionally or alternatively, example computing device 200 may support remote access from another device, via network interface 206 or via another interface (not shown), such an RS-132 or Universal Serial Bus (USB) port.

It should be understood that the examples of a computing device are provided for illustrative purposes. Further, in addition to and/or alternatively to the examples above, other combinations and/or sub combinations of a printer, computer, and server may also exist, amongst other possibilities, without departing from the scope of the embodiments herein.

Figure 3:
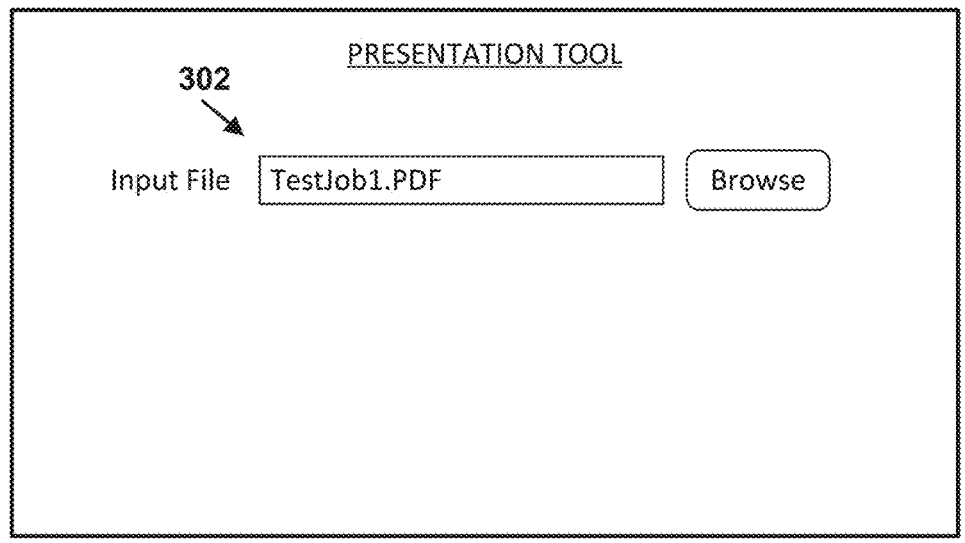
FIG. 3 illustrates an example screenshot, according to an example embodiment.

In some examples, a computing device, such as computing device 104 of FIG. 1 may provide a graphical user interface via which a user can request to determine a presentation order for a plurality of sample prints and via which the user can provide various inputs. FIG. 3 illustrates an example screenshot 300, showing an optional feature of such a graphical user interface. As shown in FIG. 3, the graphical user interface may include an input-file field 302 that allows a user to specify or select an input file from which a plurality of sample prints are to be produced. A user can type or otherwise enter a name of the input file.

Alternatively, a user can browse and search for the input file. In some examples, the graphical user interface can also allow the user to configure multiple print configurations for different respective sample prints (not shown).

Figure 4:
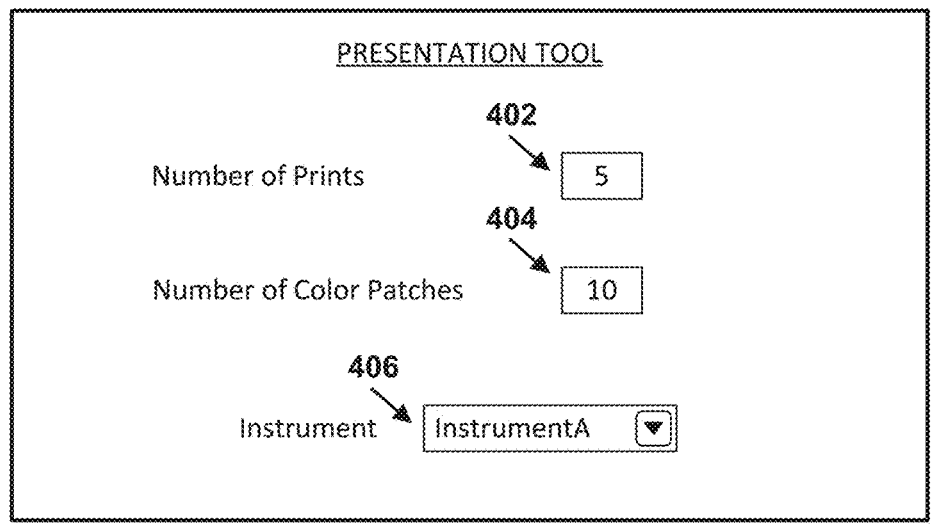
FIG. 4 illustrates another example screenshot, according to an example embodiment.

FIG. 4 illustrates another example screenshot 400, according to an example embodiment. Screenshot 400 illustrates additional features of a graphical user interface. In particular, FIG. 4 shows a number-of-prints field 402, a number-of-color-patches field 404, and an instrument field 406. A user can specify how many sample prints are to be produced by entering or otherwise inputting an integer into the number-of-prints field 402. The user can similarly specify how many color patches are to be inserted into each sample print by entering or otherwise inputting an integer into the number-of-color-patches field 404. Further, the user can specify which color-measurement instrument is going to be used to capture color-measurement data by entering or otherwise inputting a name of the color-measurement instrument in the instrument field 406. The instrument field 406 could include a drop-down feature that is populated with all of the instruments that are currently coupled to the computing device that provides the graphical user interface.

Figure 5:
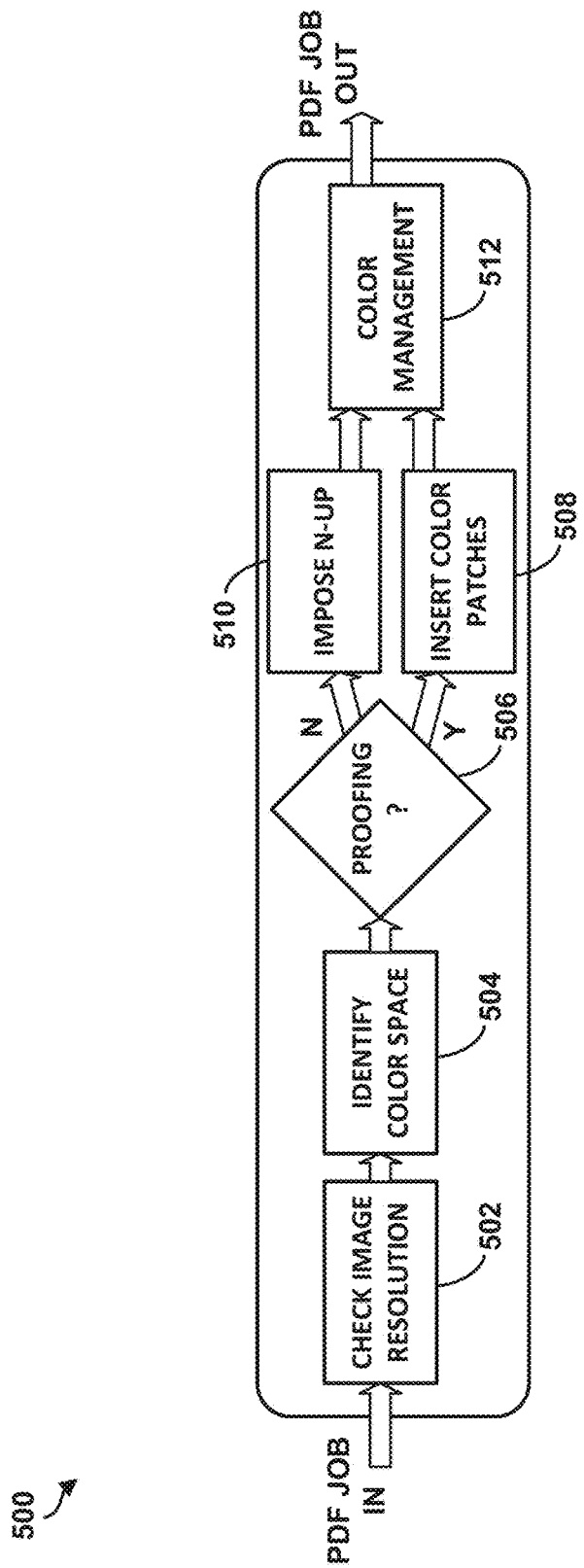
FIG. 5 illustrates an example process for inserting color-measurement patches, according to an example embodiment.

In some examples, after obtaining the input file, a computing device, such as computing device 104 or another computing device, can insert color-measurement patches into the input file. By way of example, FIG. 5 illustrates an example process 500 for inserting color-measurement patches into a sample print, according to an example embodiment. The process 500 or portions of the process 500 may be carried out within a pre-press workflow software environment. Like other modules carried out in such an environment, the process may receive a PDF file as an input and provide a PDF file as an output.

At step 502, the process 500 involves checking an image resolution of a PDF input file from which the sample print is to be generated and, at step 504, the process 500 involves identifying the color space for the sample print. Information regarding the image resolution and the color space can be stored within the metadata of the PDF file, and a computing device can read the metadata to determine the image resolution and the color space.

At step 506, the process 500 determines whether a current print job is a proofing job. If the current print job is a proofing job, then, at step 508, the process 500 involves inserting color-measurement patches into the PDF file. For instance, the color-measurement patches can be inserted into a margin (e.g., top, left, bottom, or right) or blank-space area within the PDF file. Whereas, if the current print job is not a proofing job, then, at step 510, the process 500 involves imposing N-up. As an example, multiple pages can be prepared for printing onto a bigger piece of media. For instance, a number "N" copies of the same page can be prepared for printing on a bigger piece of media. Additionally or alternatively, different pages of a print job can be prepared for printing on a bigger piece of media, or different pages of different print jobs can be prepared for printing on a bigger piece of media. Imposing N-up can maximize the use of larges of pieces of media, or rolls of wide media.

At step 512, the process 500 involves carrying out color management. As an example, colors specified in the print job can be converted to a printer's native colors, e.g., inks, in a controlled manner so as to help obtain a color match between the PDF and any sample prints created from the PDF.

Figure 6:
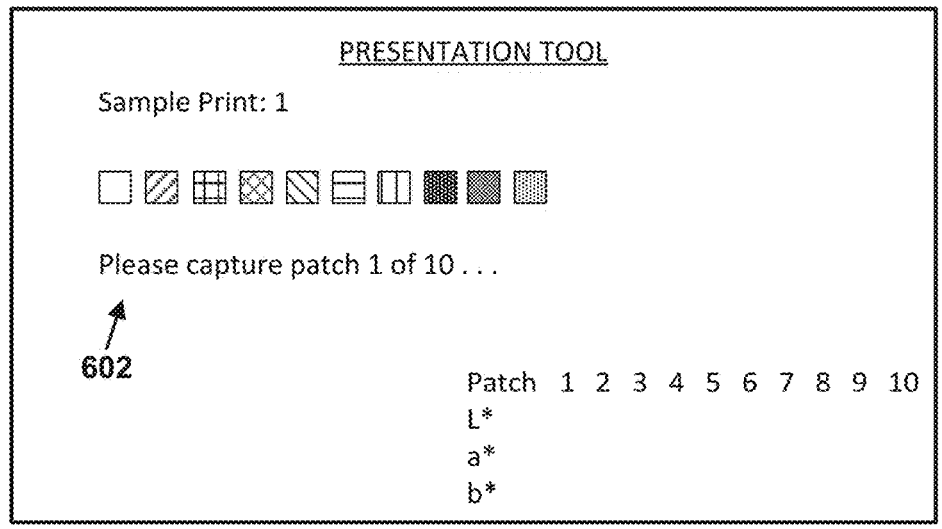
FIG. 6 illustrates another example screenshot, according to an example embodiment.

FIG. 6 illustrates another example screenshot 600, according to an example embodiment. Screenshot 600 illustrates additional features of a graphical user interface. In particular, FIG. 6 shows a prompt 602 that may be provided by the graphical user interface. The prompt 602 instructs a user to capture color-measurement data for a first color-measurement patch printed on a first sample print. The prompt 602 may be one of a series of prompts that prompts a user to capture color-measurement data for each respective color-measurement patch of a plurality of color-measurement patches. For this example, there are ten color-measurement patches for each sample print. Accordingly, there may be ten prompts for each sample print. After receiving the color-measurement data for the first color-measurement patch, the graphical user interface may prompt the user to capture color-measurement data for a second color-measurement patch.

Figure 7:
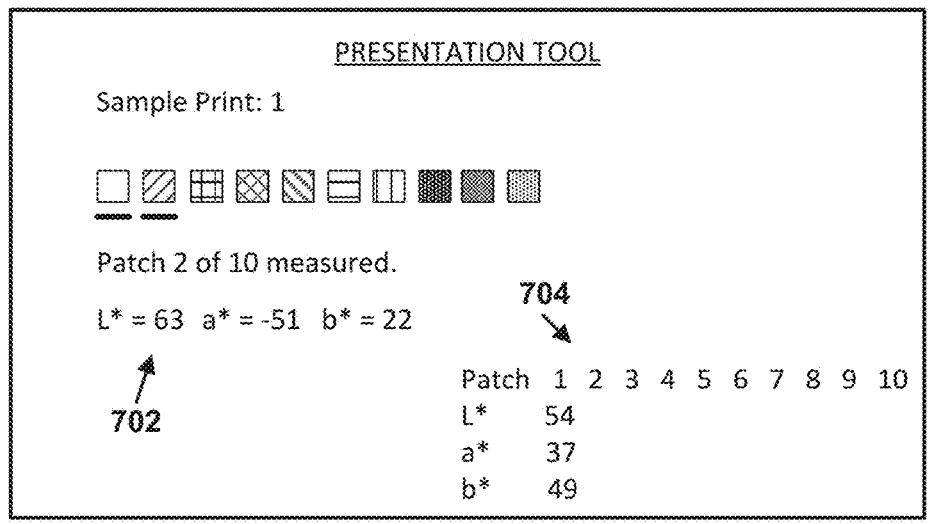
FIG. 7 illustrates another example screenshot, according to an example embodiment.

FIG. 7 illustrates another example screenshot 700, according to an example embodiment. Screenshot 700 illustrates additional features of a graphical user interface. In particular, FIG. 7 shows color measurement values 702 for a most recently captured color-measurement patch. FIG. 7 also shows a summary section 704 that identifies previously captured color-measurement values.

Figure 8:
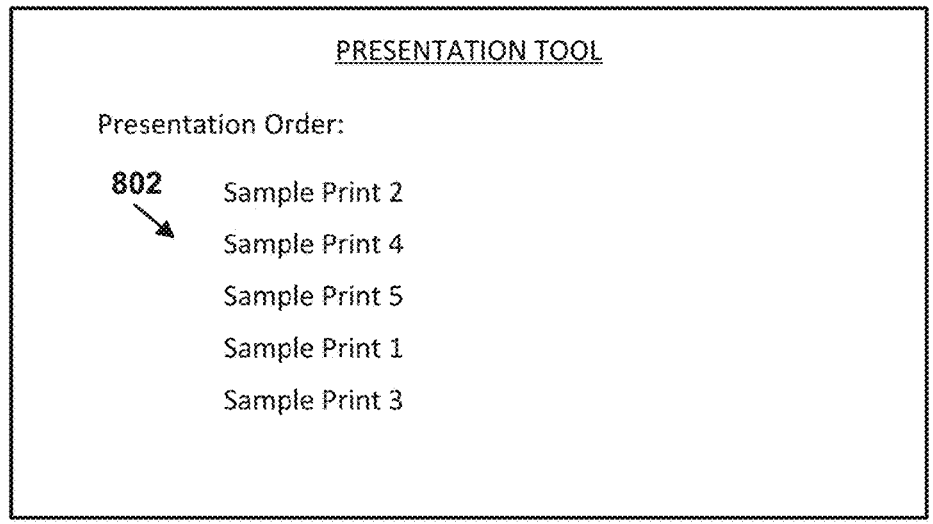
FIG. 8 illustrates another example screenshot, according to an example embodiment.

FIG. 8 illustrates another example screenshot, according to an example embodiment. Screenshot 800 shows a presentation order for five sample prints. In line with the discussion above, within the presentation order, the sample prints are arranged in order of increasing color gamut volume. In other words, "Sample Print 2" has a lowest color gamut volume, "Sample Print 4" has a second lowest color gamut volume, "Sample Print 5" has a third lowest color gamut volume, "Sample Print 1" has a fourth lowest color gamut volume, and "Sample Print 3 has a highest color gamut volume. As discussed above, a computing device can determine the color gamut volumes of each sample print using the captured color-measurement data, and then order the sample prints based on the determined color gamut volumes. A user can use the presentation order 802 to determine the order in which to display the sample prints for observation by an observer, such as a customer.

Figure 9:
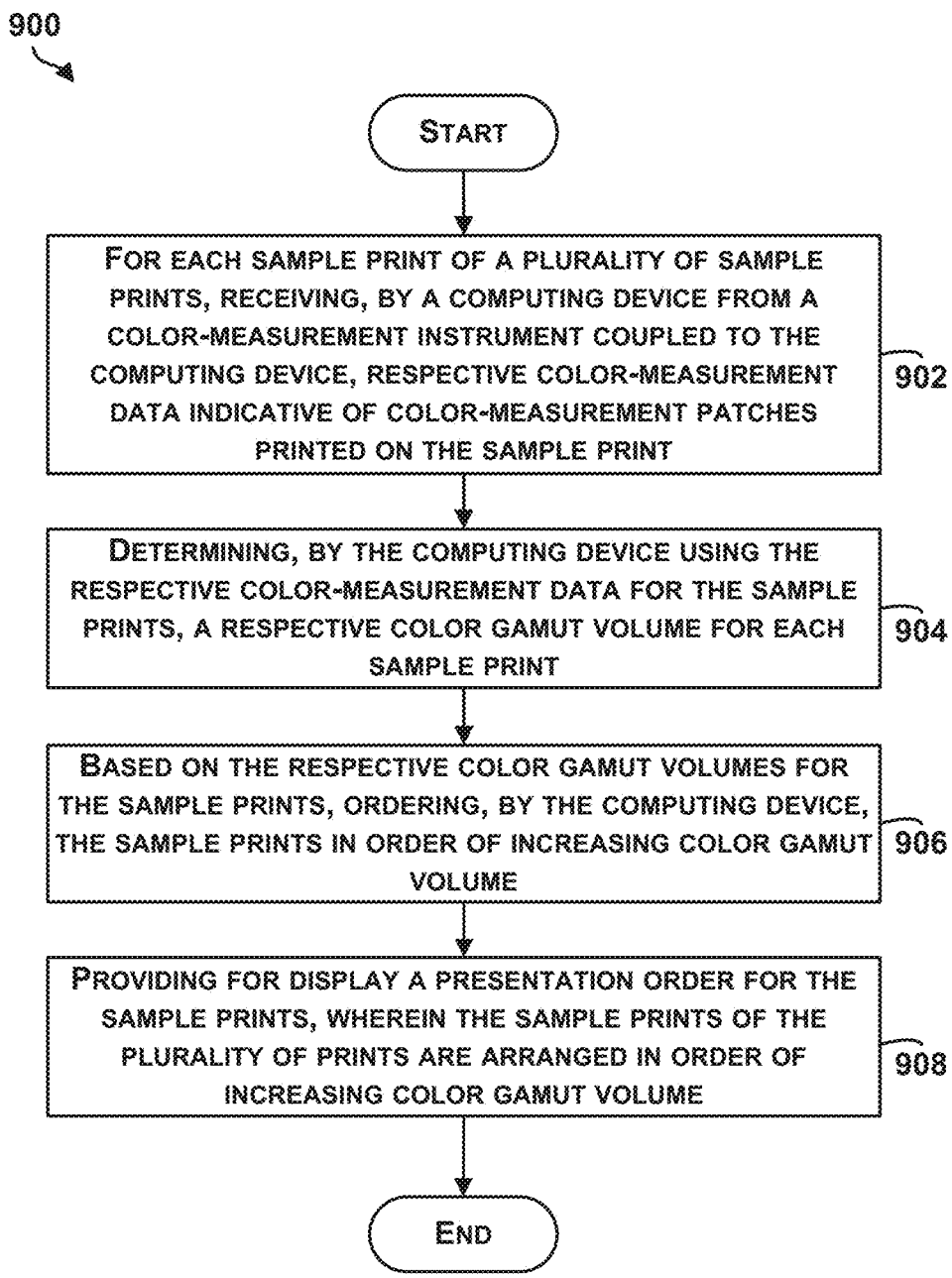
FIG. 9 shows a flowchart of an example method, according to an example embodiment.

FIG. 9 shows a flowchart of an example method 900, according to an example embodiment. Method 900 shown in FIG. 9 presents an embodiment of a method that, for example, could be used with the system shown in FIG. 1, for example, or any of the systems disclosed herein. For example, method 900 could be carried out by computing device 104 of FIG. 1 and/or could be carried out by other types of devices or device subsystems.

Method 900 may include one or more operations, functions, or actions as illustrated by one or more of blocks 902-908. Although these blocks are illustrated in a sequential order, these blocks may also be performed in parallel, and/or in a different other than those described herein. Also, the various blocks may be combined into fewer blocks, divided into additional blocks, and/or removed based upon the desired implementation.

Initially, at block 902, the method 900 includes, for each sample print of a plurality of sample prints, receiving, by a computing device from a color-measurement instrument coupled to the computing device, respective color-measurement data indicative of color-measurement patches printed on the sample print. At block 904, the method 900 includes determining, by the computing device using the respective color-measurement data for the sample prints, a respective color gamut volume for each sample print. At block 906, the method 900 includes, based on the respective color gamut volumes for the sample prints, ordering, by the computing device, the sample prints in order of increasing color gamut volume. And at block 908, the method 900 includes providing for display a presentation order for the sample prints. The sample prints of the plurality of prints are arranged in order of increasing color gamut volume.

Additional blocks, not explicitly illustrated in FIG. 9, may involve: (i) receiving, via a graphical user interface, a request to determine the presentation order for the plurality of sample prints; and providing one or more prompts that instruct a user to capture the respective color-measurement data for each sample print using the color-measurement instrument. Providing the one or more prompts may involve: (i) providing a first prompt that instructs a user to capture first color-measurement data for a first sample print of the plurality of sample prints; and (ii) after receiving the first color-measurement data, providing a second prompt that instructs the user to capture second color-measurement data for a second sample print of the plurality of sample prints.

Additional blocks may also involve inserting the color-measurement patches into an electronic file from which the sample prints of the plurality of sample prints are produced. In line with the discussion above, the computing device could receive, via a graphical user interface, data indicative of a selection of an input file. The computing device could then obtain the input file, and insert the color-measurement patches into the input file, thereby generating the electronic file.

Figure 10:
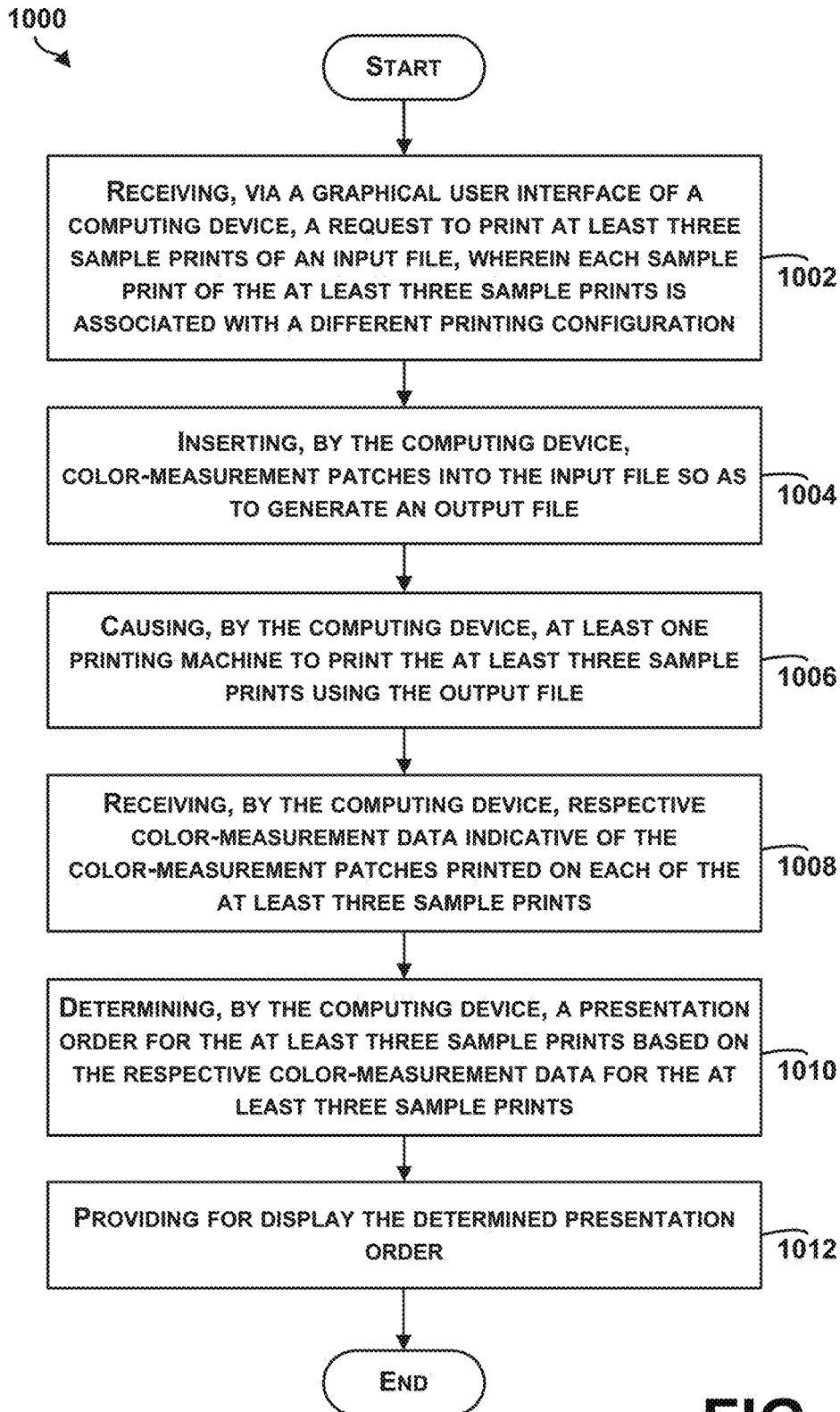
FIG. 10 shows a flowchart of another example method, according to an example embodiment.

FIG. 10 shows a flowchart of another example method 1000, according to an example embodiment. Method 1000 shown in FIG. 10 presents an embodiment of a method that, for example, could be used with the system shown in FIG. 1, for example, or any of the systems disclosed herein. For example, method 1000 could be carried out by computing device 104 of FIG. 1 and/or could be carried out by other types of devices or device sub systems.

Method 1000 may include one or more operations, functions, or actions as illustrated by one or more of blocks 1002-1008. Although these blocks are illustrated in a sequential order, these blocks may also be performed in parallel, and/or in a different other than those described herein. Also, the various blocks may be combined into fewer blocks, divided into additional blocks, and/or removed based upon the desired implementation.

Initially, at block 1002, the method 1000 includes receiving, via a graphical user interface of a computing device, a request to print at least three sample prints of an input file. Each sample print of the at least three sample prints is associated with a different printing configuration.

At block 1004, the method 1000 includes inserting, by the computing device, color-measurement patches into the input file so as to generate an output file. At block 1006, the method 1000 includes causing, by the computing device, at least one printing machine to print the at least three sample prints using the output file. At block 1008, the method 1000 includes receiving, by the computing device, respective color-measurement data indicative of the color-measurement patches printed on each of the at least three sample prints.

At block 1010, the method 1000 includes determining, by the computing device, a presentation order for the at least three sample prints based on the respective color-measurement data for the at least three sample prints. Determining the presentation order for the at least three sample prints could involve: (i) determining, by the computing device using the respective color-measurement data for the at least three sample prints, a respective color gamut volume for each sample print of the at least three sample prints; and (ii) based on the respective color gamut volumes for the at least three sample prints, ordering, by the computing device, the sample prints in order of increasing color gamut volume so as to determine the presentation order.

At block 1012, the method 1000 includes providing for display the determined presentation order.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system comprising:
   a processor; and
   a non-transitory computer-readable medium having stored therein instructions that are executable to cause the system to perform functions comprising:
      for each sample print of a plurality of sample prints, receiving respective color-measurement data indicative of color-measurement patches printed on the sample print,
      determining, using the respective color-measurement data for the sample prints, a respective color gamut volume for each sample print,
      ordering the sample prints in order of increasing color gamut volume using the respective color gamut volumes for the sample prints; and
      providing for display a presentation order for the sample prints, wherein the sample prints of the plurality of sample prints are arranged in order of increasing color gamut volume.

2. The system of claim 1, wherein receiving the respective color-measurement data comprises receiving the respective color-measurement data from a color-measurement instrument.

3. The system of claim 1, wherein the functions further comprise:
   receiving, via a graphical user interface, a request to determine the presentation order for the plurality of sample prints; and
   providing one or more prompts that instruct a user to capture the respective color-measurement data for each sample print.

4. The system of claim 1, wherein the functions further comprise receiving, via a graphical user interface, data indicating how many sample prints are in the plurality of sample prints.

5. The system of claim 1, wherein the functions further comprise inserting the color-measurement patches into an electronic file from which the sample prints of the plurality of sample prints are produced.

6. The system of claim 5, wherein inserting the color-measurement patches into the electronic file comprises:
   obtaining an input file;
   determining a color space of the input file; and
   inserting the color-measurement patches into the input file in accordance with the determined color space, thereby generating the electronic file.

7. The system of claim 6, wherein the input file is a Portable Document Format (PDF) file, and wherein the electronic file is a PDF file.

8. The system of claim 1, wherein the color-measurement patches printed on each sample print comprise a plurality of patches of different colors, and wherein the respective color-measurement data for the sample prints comprises measurement values indicative of respective colors of the plurality of patches of different colors.

9. The system of claim 8, wherein the plurality of patches of different colors comprises at least a cyan patch, a magenta patch, a yellow patch, a key patch, a red patch, a green patch, and a blue patch.

10. The system of claim 8, wherein the measurement values comprise three-dimensional coordinates of a device-independent color space.

11. The system of claim 1, wherein the plurality of sample prints comprise a first sample print printed on a first type of media and a second sample print printed on a second type of media that is different from the first type of media.

12. The system of claim 1, wherein the plurality of sample prints comprise a first sample print printed using a first printer and a second sample print printed using a second printer that is different from the first printer.

13. The system of claim 1, wherein the sample prints of the plurality of sample prints have consistent color appearance.

14. A method comprising:
for each sample print of a plurality of sample prints, receiving, by a computing device from a color-measurement instrument coupled to the computing device, respective color-measurement data indicative of color-measurement patches printed on the sample print;
determining, by the computing device using the respective color-measurement data for the sample prints, a respective color gamut volume for each sample print;
based on the respective color gamut volumes for the sample prints, ordering, by the computing device, the sample prints in order of increasing color gamut volume; and
providing for display a presentation order for the sample prints, wherein the sample prints of the plurality of prints are arranged in order of increasing color gamut volume.

15. The method of claim 14, further comprising:
receiving, via a graphical user interface, a request to determine the presentation order for the plurality of sample prints; and
providing one or more prompts that instruct a user to capture the respective color-measurement data for each sample print using the color-measurement instrument.

16. The method of claim 15, wherein providing the one or more prompts comprises:

providing a first prompt that instructs a user to capture first color-measurement data for a first sample print of the plurality of sample prints; and
after receiving the first color-measurement data, providing a second prompt that instructs the user to capture second color-measurement data for a second sample print of the plurality of sample prints.

17. The method of claim 14, further comprising inserting the color-measurement patches into an electronic file from which the sample prints of the plurality of sample prints are produced.

18. The method of claim 17, further comprising:
receiving, via a graphical user interface, data indicative of a selection of an input file;
obtaining the input file; and
inserting the color-measurement patches into the input file, thereby generating the electronic file.

19. A method comprising:
receiving, via a graphical use interface of a computing device, a request to print at least three sample prints of an input file, wherein each sample print of the at least three sample prints is associated with different printing configuration;
insetting, by the computing device, color-measurement patches into the input file so as to generate an output file;
causing, by the computing device, at least one printer to print the at least three sample prints using the output file;
receiving, by the computing device, respective color-measurement data indicative of the color-measurement patches printed on each of the at least three sample prints;
determining, by the computing device, a presentation order for the at least three sample prints based on the respective color-measurement data for the at least three sample prints, wherein determining the presentation order for the at least three sample prints comprises:
determining, by the computing device using the respective color-measurement data for the at least three sample prints, a respective color gamut volume for each sample print of the at least three sample prints, and
based on the respective color gamut volumes for the at least three sample prints, ordering, by the computing device, the sample prints in order of increasing color gamut volume so as to determine the presentation order; and
providing for displaying the determined presentation order.

* * * * *